United States Patent
Showalter

(10) Patent No.: US 7,288,139 B1
(45) Date of Patent: Oct. 30, 2007

(54) THREE-PHASE CYCLONIC FLUID SEPARATOR WITH A DEBRIS TRAP

(75) Inventor: Stephen Showalter, Milmont Park, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/470,293

(22) Filed: Sep. 6, 2006

(51) Int. Cl.
*B01D 19/00* (2006.01)

(52) U.S. Cl. .................. 96/1; 96/209; 210/167.03; 210/223

(58) Field of Classification Search .................. 95/28, 95/261; 96/1, 209, 210, 211, 212; 210/167.03, 210/167.02, 223, 695, 788, 512.1
See application file for complete search history.

(56) References Cited

U.S. PATENT DOCUMENTS

| 4,199,443 A | 4/1980 | Tauber |
| 4,282,016 A | 8/1981 | Tauber et al. |
| 4,707,165 A * | 11/1987 | Tauber et al. .................. 96/174 |
| 4,795,561 A | 1/1989 | Aslin |
| 5,028,318 A | 7/1991 | Aslin |
| 5,228,594 A | 7/1993 | Aslin |
| 5,234,017 A | 8/1993 | Aslin et al. |
| 6,348,087 B1 | 2/2002 | Aslin |

* cited by examiner

*Primary Examiner*—Duane Smith
*Assistant Examiner*—Douglas J Theisen
(74) *Attorney, Agent, or Firm*—Loren H. Uthoff, Jr.

(57) ABSTRACT

An apparatus separates liquid, gas and solid components of a mixture in a fluid system. An inlet for receiving the mixture opens into a separation chamber tangentially with a cylindrical side wall and a gas outlet has an opening in a first end wall adjacent the inlet to allow gas to exit the separator. A fluid outlet is located in an opposing second end wall. A debris passage extends through the cylindrical side wall and oriented so that the radial velocity of the particles within the separation chamber directs the particles through the debris passage. The debris passage leads to a particle collection chamber in which the particles accumulate. Unlike prior separators that relied on the tangential velocity of the particles, the present apparatus utilizes the greater radial velocity to drive the particles from the separation chamber into the particle collection chamber.

17 Claims, 2 Drawing Sheets

THREE-PHASE CYCLONIC FLUID SEPARATOR WITH A DEBRIS TRAP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to devices for separating debris particles and gas from fluids in machinery, such as lubricants in an engine; and more particularly to such devices that perform the separation by creating a fluid vortex.

2. Description of the Related Art

Modern turbine engines, such as those used in aircraft, are lubricated by oil supplied to moving engine components by a pump that draws the oil from a reservoir. The oil flows from those components into sumps within the engine from which scavenger pumps force the fluid back to the reservoir. In the course of flowing through the engine, the oil often picks up metal and non-metal debris particles and also becomes aerated due to a turbulent flow. Therefore, it is common practice for this mixture to pass through an apparatus that separates the particles and entrained gas from the lubricating oil prior to entering the reservoir.

Such separation has conventionally been performed by a three-phase cyclonic separator, such as the one described in U.S. Pat. No. 6,348,087. With reference to FIG. 1, this type of separator receives the fluid mixture from the engine via an inlet passage 100 that is tangentially aligned with the curvature of the inner wall 102 of a cylindrical chamber 106. This alignment causes the fluid to travel in a vortex 108 downward into an annular debris collection area 110. The centrifugal force of the vortex drives the heavier debris particles outward and downward against the cylindrical inner wall 102 and into the debris collection area while the fluid flowed through a centrally located outlet 104. The tangential velocity of the circular flow drives the debris particles into a linear exit passage 112 that extends tangentially from the curved surface of the cylindrical inner wall 102 in the debris collection area. A magnetic particle collector 114 was located at the remote end of the exit passage to retain metal particles. The particles must travel some distance along that exit passage 112 before reaching a magnetic particle collector 114. Therefore upon entering the exit passage, the particles were required to have enough momentum to reach the magnetic particle collector. Small particles often did not possess sufficient momentum and thus were not retained by the collector.

Specifically, upon entering the exit passage, the particle was out of the rotational force field of the vortex. The primary forces counteracting the particle motion were gravity and drag forces. The drag force $F_d$ is given by the expression:

$$F_d = \frac{C_d \rho A V^2}{2}$$

where $C_d$ is the drag coefficient, $\rho$ is the transport fluid density, A is the projected area of the particle in the direction of flow, and V is the particle velocity which is assumed to be equal to the fluid velocity.

The settling velocity $V_S$ of the particle follows Stokes law and is defined by the equation:

$$V_s = \frac{g d_p^2 (\rho_p - \rho_f)}{18 \mu}$$

in which g is the earth gravitational force, $d_p$ is the particle's primary dimension, $\rho_p$ is the particle's density, $\rho_f$ is the density of the transport fluid, and $\mu$ is the fluid viscosity.

The drag force acts against the particle's momentum, while the force of gravity moves the particle normal to its intended trajectory. The attractive force of the magnetic collector is not apparent until the particle is relatively close due to the design of the pole piece that confines the flux lines to a small envelope. Therefore, the particle must possess sufficient kinetic energy to sustain the dissipation of the drag force and reach the perimeter of the magnetic influence. The gravity force and settling velocity for small particles is insignificant for the brief particle transport period (typically <150 milliseconds) and in this model are disregarded.

It is desirable to have a small a fluid pressure drop between the separator inlet and lubricant outlet as possible. However, the pressure drop is directly proportional to the flow rate of the fluid and thus the tangential velocity of the circular flow. In other words, as the pressure drop is reduced so too is the tangential velocity of the fluid flow which drives the particles from the cylindrical chamber into the collector exit passage. This relationship limits the physical size (diameter) of the separator and thus the amount of fluid flow there through. As a consequence, enlarging the diameter of the separator chamber to accommodate a greater fluid flow reduces the tangential force of the fluid flowing through the chamber and the ability to separate out the particles.

Therefore, it is desirable to improve the debris transport efficiency of the separated particle from the chamber wall to the debris collection site in order to provide a cyclonic fluid separator that can efficiently operate at greater fluid flow rates.

SUMMARY OF THE INVENTION

An apparatus for separating liquid and particles from a mixture has a separation chamber with a cylindrical wall that extends about a longitudinal axis between a first end wall and a second end wall. An inlet for receiving the mixture opens into the separation chamber tangentially to the cylindrical wall. A fluid outlet at the second end of the separation chamber provides an exit for the liquid to flow from the separation chamber. A debris passage opens through the cylindrical wall and is oriented wherein a radial velocity of the particles within the separation chamber directs the particles through the debris passage. Preferably, the debris passage extends radially from the longitudinal axis of the separation chamber. The debris passage leads to a particle collection chamber in which the particles accumulate. The collection chamber preferably extends from the debris passage parallel to the longitudinal axis and away from the first end of the separation chamber.

Unlike prior separators that relied on the tangential velocity of the particles, the present apparatus utilizes the greater radial velocity to drive the particles from the separation chamber into the particle collection chamber.

The present apparatus also can be use to separate gas, as well as liquid and particles, from a mixture. In this embodiment, a gas outlet is provided in the first end of the separation chamber through which gas separated from the mixture exits.

DETAILED DESCRIPTION OF THE INVENTION

Figure 1:
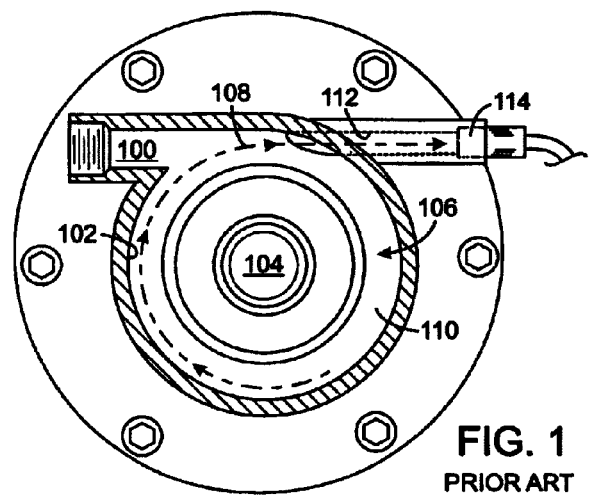
FIG. 1 is a radial cross section view through a prior three-phase cyclonic separator.
Figure 2:
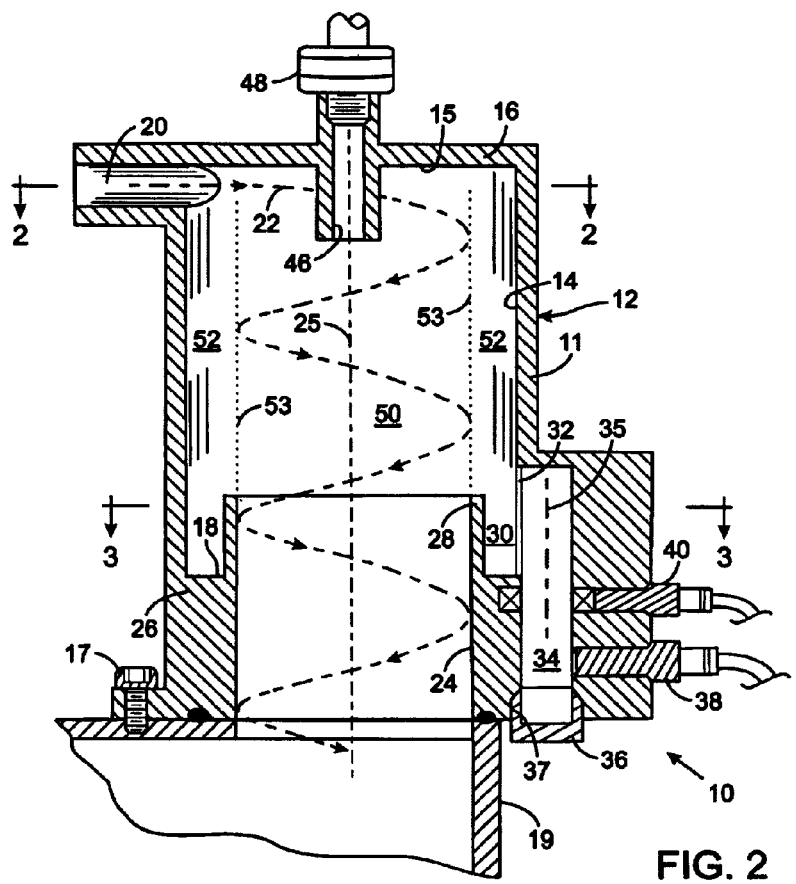
FIG. 2 is an axial cross-section through a three-phase cyclonic separator according to the present invention.

With initial reference to FIG. 2, a three-phase separator 10 is provided to separate liquid, gas and solid components from a mixture. Although the separator 10 has particular utility in an engine lubrication system, it should be appreciated that the separator can be employed in other types of fluid systems. The separator 10 comprises a housing 12 with a tubular, cylindrical side wall 11 extending between a first end wall 16 and a second end wall 26, thereby forming a circular cylindrical separation chamber 14 with a first, or top, end 15 and a second, or bottom, end 18. The housing 12 abuts a lubricant reservoir 19 of the lubrication system and is attached thereto by plurality of machine screws 17 or other fastening mechanism.

Figure 3:
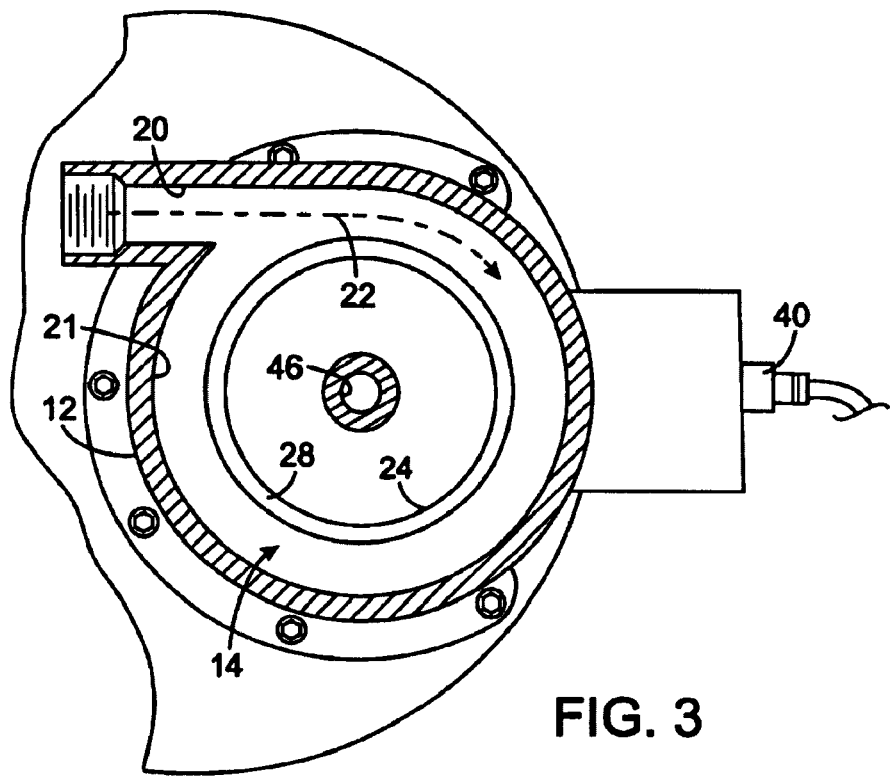
FIG. 3 is a cross-section along line 2-2 in FIG. 2 depicting the inlet of the separator.

With additional reference to FIG. 3, an inlet 20 opens into the separation chamber 14 adjacent the first end wall 16 and is aligned tangentially with curved surface of the cylindrical separation chamber 14. As will be described, a mixture of materials to be separated enters the separation chamber 14 through the inlet 20 and thereafter flows in a helical vortex 22 that spirals downward through the separation chamber toward the second end 18. A fluid outlet 24 is formed through the second end wall 26 of the separation chamber 14 with an annular collector wall 28 projecting as a tube from the second end wall into the separation chamber 14 and surrounding the fluid outlet 24. Note that the fluid outlet 24 of the separator 10 is aligned with a central first longitudinal axis 25 about which the separation chamber 14 is centered and that axis extends into the lubricant reservoir 19.

Figure 4:
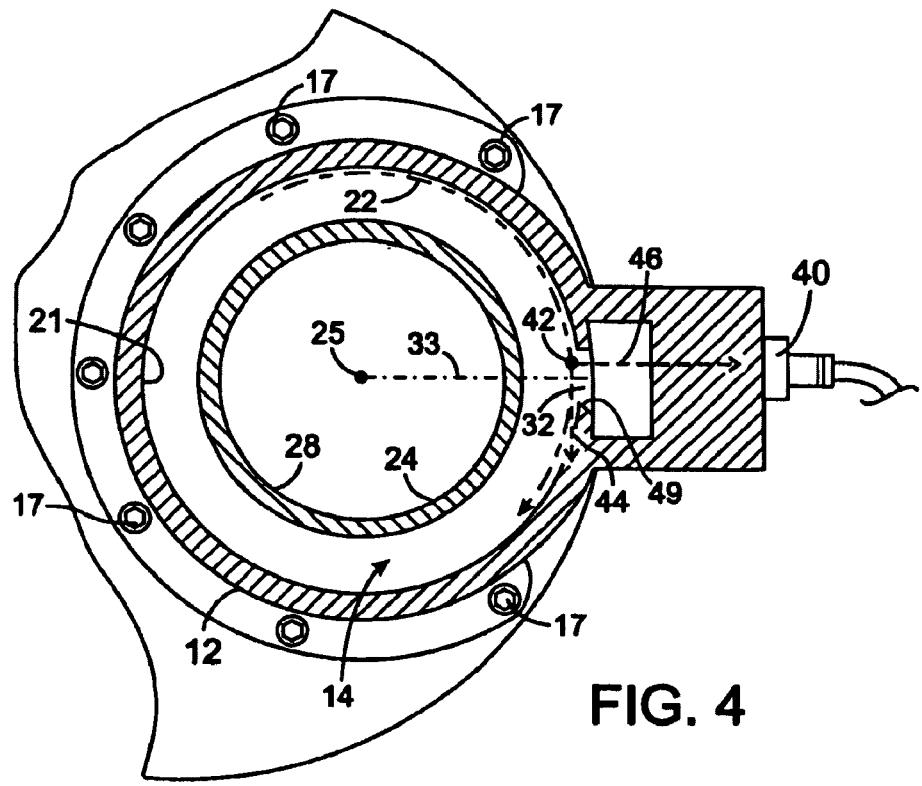
FIG. 4 is a cross-section along line 3-3 in FIG. 2 depicting the debris outlet of the separator.

Referring to FIGS. 2 and 4, the second end wall 26 and the annular collector wall 28 form a barrier defining a collection region 30 within the separation chamber 14 which receives particles that have been separated from the mixture entering through the inlet 20. A debris passage 32 opens through the cylindrical side wall 11 of the separation chamber 14 adjacent the collection region 30. The debris passage 32 also opens into an elongated debris collection chamber 34 outside the separation chamber and having primary axis 35 that extends parallel to the first longitudinal axis 25. Note that the debris passage 32 is centered on a second longitudinal axis 33 extending radially from the first longitudinal axis 25 and is not aligned tangentially with the curved inner surface 21 of the separation chamber. Thus the debris passage 32 is orthogonal to the primary axis of the debris collection chamber 34. It will be understood from the description of operation of the separator that the debris passage 32 does not have to be precisely aligned with the second longitudinal axis 33.

The debris passage 32 communicates with the upper section of the particle collection chamber 34 which continues to extend downward away from the first end 15 of the separation chamber and toward the lubricant reservoir 19. A plug 36 closes an external opening 37 at the lower end of the particle collection chamber 34 and is removable when it is necessary to clean out the particles that are collected.

A conventional magnetic probe 38, for gathering metal particles that enter the particle collection chamber 34, is located in an aperture that opens into that chamber adjacent the plug 36. The magnetic probe produces an electrical signal that indicates the amount of metal particles that have been gathered. When the electrical signal indicates that a large quantity of particle have been gathered, the magnetic probe 38 can be removed to extract particles and clean the probe. A debris sensor 40 of a flow-through type is located along the particle collection chamber 34 between the debris passage 32 and the magnetic probe 38. The debris sensor 40 produces an electrical signal indicating that the amount of particles passing through the particle collection chamber from the debris passage 32 to the plug 36. For example, the debris sensor 40 can be a conventional optical device that transmits a beam of light across the particle collection chamber 34 to a light detector that responds by producing a second electrical signal. The intensity of the light that reaches the detector is affected by the debris passing through the particle collection chamber. Other types of sensors, such as an ultrasonic device, can also be utilized to detect the flow of particles through the particle collection chamber.

The separator 10 includes a gas outlet 46 in the center of the first end wall 16 within the separation chamber 14. The gas separated from the mixture entering the separation chamber 14 and also gas within the lubricant reservoir 19 are vented through the gas outlet 46. A pressure relief valve 48 is attached to the gas outlet 46 and opens a passage from the gas outlet when the pressure within the separator 10 reaches a given threshold level, (e.g. 0.5-0.7 bar).

INDUSTRIAL APPLICABILITY

With reference to FIGS. 2 and 3, the present three-phase separator 10 has particular application to processing a lubricant for an aircraft engine. Scavenger pumps feed the lubricant mixture under the pressure from the engine into the inlet 20. The flow of the lubricant mixture enters the separation chamber 14 tangentially to the surface of the curved side wall 11 and follows a path curving around the cylindrical interior surface of the separation chamber 14 and downward toward the second end wall 26 of the chamber creating a helical vortex 22. The annular collector wall 28 divides the separation chamber 14 into two concentric regions, a cylindrical inner region 50 and an annular outer region 52 around the inner region 50. The boundary between the inner and outer regions 50 and 52 is indicated by dotted lines 53 in FIG. 2.

As the mixture spirals downward along the curved side wall 11 of the housing 12, the cyclonic flow creates a centrifugal force that drives the relatively heavy debris particles to the outer periphery of the flow pattern, while at the same time allowing gas bubbles to coalesce at the center of the pattern (about the central first longitudinal axis 25). The debris particles are forced downward into the outer annular collection region 30 where the second end wall 26 arrests the downward motion of those particles.

Conventional cyclonic separators with a tangential debris exit passage relied solely on the tangential component of the particle's velocity and did not utilize the radial velocity component. In those separators, the radial component of the particle velocity occurred only during the separation process, i.e. as the particle was centrifuged toward the curved side wall of the separation chamber. Once at the wall, the radial component was arrested. A centrifugal force still acted on the particle—but at this point was detrimental to the direction of transport, i.e. the centrifugal force pressed the particle against the sidewall.

The present three-phase separator 10 harnesses both velocity components or at least the radial component which has the higher velocity potential. In FIG. 4, a particle 42 at the opening of the debris passage 32 has a velocity that can be resolved into tangential velocity 44 and a radial velocity 46 depicted by orthogonally oriented arrows. A simple equation defining particle settling time in a gravity field is:

$$V_s = \frac{g_s d_p^2 (\rho_p - \rho_f)}{18 \mu}$$

In a cyclonic separator, the value for "$g_s$" in this equation is much greater than one earth g. For example, a recent test on an aircraft produced acceleration level of 50 g with tangential velocity of 14 feet per second (FPS) at the flight idle speed of the engine and 500 g with tangential velocity of 45 FPS at the takeoff speed of the engine. The corresponding radial velocity components were 21 FPS at flight idle speed and 210 FPS at takeoff speed. This empirical data clearly demonstrates that the radial particle velocity vector is significantly greater than the tangential velocity vector.

Therefore, the debris passage 32 into the collection chamber 34 are located in the present three-phase separator 10 at a position which is not tangential to the curvature of the separation chamber side wall 11. In fact, the debris passage 32 is aligned with a second longitudinal axis 33 extending radially from the first longitudinal axis 25 of the separation chamber 14 so as to take optimum advantage of the radial particle velocity. However, the debris passage 32 does not have to be precisely centered on the a line extending radially from the first longitudinal axis 25 in order for the radial velocity to force the particle through that passage. Furthermore, the trailing vertical edge 49 of the debris passage 32 preferably is beveled to permit the tangential velocity to aid in directing the particle into the collection chamber 34, however the primary force for that motion still is the radial velocity.

Because the present invention utilizes the radial particle velocity to drive particles from the separation chamber 14 and into the debris passage 32, it functions more efficiently at lower fluid flow rates, at which the particle velocity also is reduced, than a conventional separator with a tangential debris exit passage. This enables the hydraulic system to be designed to operate with a smaller pressure drop across the present separator 10.

After entering the collection chamber 34, a debris particle travels parallel to the first longitudinal axis 25 toward the opening 37 at the remote end from the debris passage 32. Both magnetic and non-magnetic particles are detected by the flow-through type debris sensor 40 which emits a first electrical signal indicating that debris. The magnetic probe 38 then gathers the metal particles in that debris and emits a second electrical signal which indicates the accumulated amount of metal particles. The first and second electrical signals are applied to a computer for analysis of engine wear. In addition, when those electrical signals indicate a significant amount of debris has entered the collection chamber 34, a technician removes the plug 36 and cleans out that chamber.

Returning to activity in the separation chamber 14, the cyclonic fluid flow results in liquid from the lubricant mixture filling the annular outer region 52 and the outer periphery of the inner region 50. The liquid spiraling downward exits through the fluid outlet 24 flowing into the lubricant reservoir 19. Any gas that is entrained in this spiraling mixture migrates toward the first longitudinal axis 25. The separated gas is able to flow downward through the fluid outlet 24 into a vapor space at the top of the lubricant reservoir 19. When pressure in that vapor space and the separation chamber 14 increases above a predefined threshold (e.g. 0.5-0.7 bar), the pressure relief valve 48 opens allowing the gas to exit via the outlet 46 at the top of the separation chamber.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An apparatus for separating liquid and particles from a mixture, said apparatus comprising:
   a separation chamber having a cylindrical wall extending between a first end and a second end and about a longitudinal axis;
   an inlet, for receiving the mixture, opens into the separation chamber substantially tangential to the cylindrical wall;
   a gas outlet in the first end of the separation chamber through which gas separated from the mixture exits;
   a fluid outlet in the second end of the separation chamber through which liquid flows from the separation chamber;
   a debris passage extending through the cylindrical wall and oriented wherein a radial velocity of the particles within the separation chamber directs the particles through the debris passage; and
   a particle collection chamber into which the debris passage communicates to receive the particles.

2. The apparatus as recited in claim 1 wherein the debris passage extends along a radial line projecting from the longitudinal axis of the cylindrical wall.

3. The apparatus as recited in claim 1 further comprising an annular wall projecting into the separation chamber from the second end and forming a collection region between the annular wall and the cylindrical wall, wherein the debris passage opens into the collection region.

4. The apparatus as recited in claim 1 wherein the particle collection chamber extends from the debris passage parallel to the longitudinal axis.

5. The apparatus as recited in claim 4 wherein the particle collection chamber includes an external opening through which collected debris is extracted from the apparatus, and a closure for the external opening.

6. The apparatus as recited in claim 1 further comprising a magnetic probe extending into the particle collection chamber for gathering metal particles in the debris.

7. The apparatus as recited in claim 6 wherein the magnetic probe produces an electrical signal indicating an amount of metal particles that has been gathered.

8. The apparatus as recited in claim 1 further comprising a sensor that produces an electrical signal indicating an amount of metallic and non-metallic debris in the particle collection chamber.

9. An apparatus for separating liquid and particles from a mixture, said apparatus comprising a housing that comprises:
- a separation chamber having a first end and a second end with a cylindrical wall extending there between centered about a first longitudinal axis;
- an inlet, for receiving the mixture, opens into the separation chamber in an orientation which directs the mixture to flow in a vortex;
- a fluid outlet in the second end of the separation chamber through which liquid separated from the mixture flows;
- a debris passage extending through with the cylindrical wall along a second longitudinal axis projecting radially from the first longitudinal axis;
- an annular wall projecting into the separation chamber from the second end and forming a collection region between the annular wall and the cylindrical wall, wherein the debris passage opens into the collection region; and
- a particle collection chamber into which the debris passage communicates.

10. The apparatus as recited in claim 9 further comprising a gas outlet in the first end of the separation chamber through which gas separated from the mixture exits.

11. The apparatus as recited in claim 9 wherein the particle collection chamber extends from the debris passage parallel to the first longitudinal axis and away from the first end of the separation chamber toward a collection end.

12. The apparatus as recited in claim 11 wherein the particle collection chamber includes an external opening at the collection end, and a closure for the external opening.

13. The apparatus as recited in claim 9 further comprising a magnetic probe extending into the particle collection chamber for gathering metal particles.

14. The apparatus as recited in claim 13 wherein the magnetic probe produces an electrical signal indicating an amount of metal particles that has been gathered.

15. The apparatus as recited in claim 9 further comprising a sensor that produces an electrical signal indicating an amount of debris in the particle collection chamber.

16. An apparatus for separating liquid, gas, and particles from a mixture, said apparatus comprising:
- a separation chamber having a cylindrical wall extending between a first end and a second end and about a longitudinal axis;
- an inlet, for receiving the mixture, opens into the separation chamber proximate to the first end and tangentially to the cylindrical wall;
- a gas outlet at the first end of the separation chamber through which gas separated from the mixture exits;
- a fluid outlet in the second end of the separation chamber through which liquid flows from the separation chamber;
- a debris passage extending through the cylindrical wall and oriented wherein a radial velocity of the particles within the separation chamber directs the particles through the debris passage; and
- a particle collection chamber into which the debris passage communicates and extending from the debris passage parallel to the longitudinal axis and away from the first end of the separation chamber.

17. The apparatus as recited in claim 16 further comprising a magnetic probe extending into the particle collection chamber for gathering metal particles.

* * * * *